United States Patent
Kim et al.

(10) Patent No.: US 8,648,985 B2
(45) Date of Patent: Feb. 11, 2014

(54) LIQUID CRYSTAL DISPLAY DEVICE

(75) Inventors: Yong-Hwan Kim, Seoul (KR);
Jang-Soo Kim, Yongin-si (KR);
Hong-Suk Yoo, Anyang-si (KR);
Seung-Soo Baek, Seoul (KR);
Hwa-Yeul Oh, Seoul (KR); Jae-Ho Choi, Seoul (KR); Jong-In Kim, Suwon-si (KR); Sang-Hee Jang, Bucheon-si (KR)

(73) Assignee: Samsung Display Co., Ltd. (KR)

( * ) Notice: Subject to any disclaimer, the term of this patent is extended or adjusted under 35 U.S.C. 154(b) by 986 days.

(21) Appl. No.: 12/612,620

(22) Filed: Nov. 4, 2009

(65) Prior Publication Data

US 2010/0245698 A1     Sep. 30, 2010

(30) Foreign Application Priority Data

Mar. 31, 2009  (KR) .................. 10-2009-0027562

(51) Int. Cl.
*G02F 1/1343*     (2006.01)
*G02F 1/1368*     (2006.01)

(52) U.S. Cl.
USPC ............. 349/110; 349/43; 349/48; 349/106; 349/111; 349/143

(58) Field of Classification Search
USPC ......... 349/38, 43, 44, 48, 110, 111, 139, 143, 349/39, 106; 345/92; 257/59, 72
See application file for complete search history.

(56) References Cited

U.S. PATENT DOCUMENTS

| | | | |
|---|---|---|---|
| 2004/0032554 A1* | 2/2004 | Yoon et al. | 349/113 |
| 2005/0078240 A1* | 4/2005 | Murade | 349/110 |
| 2006/0290829 A1* | 12/2006 | Kim | 349/44 |
| 2008/0012808 A1 | 1/2008 | Kurahashi et al. | |
| 2009/0073368 A1* | 3/2009 | Wang et al. | 349/143 |

FOREIGN PATENT DOCUMENTS

| | | |
|---|---|---|
| JP | 2005536768 | 12/2005 |
| JP | 2007-264233 | 10/2007 |
| JP | 2008-241974 | 10/2008 |
| KR | 1019940015578 | 7/1994 |
| KR | 1020030089952 A | 11/2003 |
| KR | 1020040016663 A | 2/2004 |
| KR | 1020040057715 A | 7/2004 |
| KR | 1020040061594 A | 7/2004 |
| KR | 1020040110884 A | 12/2004 |

* cited by examiner

*Primary Examiner* — Dung Nguyen
*Assistant Examiner* — Tai Duong
(74) *Attorney, Agent, or Firm* — Innovation Counsel LLP (57) ABSTRACT

The present invention relates to a liquid crystal display. The liquid crystal display has a lower panel including a first pixel area having a first pixel electrode and a first light leakage preventing member, a final pixel area having a second pixel electrode and a second light leakage preventing member, and middle pixel areas disposed between the first pixel area and the final pixel area, each of the middle pixel areas including a first middle pixel electrode and a second middle pixel electrode. Accordingly, light leakage may be effectively prevented at the first pixel area and the final pixel area that are disposed on the edge.

20 Claims, 11 Drawing Sheets

LIQUID CRYSTAL DISPLAY DEVICE

CROSS-REFERENCE TO RELATED APPLICATION

This application claims priority to and the benefit of Korean Patent Application No. 10-2009-0027562 filed in the Korean Intellectual Property Office on Mar. 31, 2009, the entire contents of which are incorporated herein by reference.

BACKGROUND (a) Field of the Invention

The present invention relates to a liquid crystal display and, more particulaly, to a liquid crystal display having high efficiency for preventing light leakage.

(b) Discussion of Related Art

Currently, various flat panel displays have been developed and used, including a liquid crystal display with a liquid crystal layer formed between a lower panel and an upper panel. In general, such liquid crystal displays includes a plurality of pixel areas where color filters are disposed. However, when the color filters are formed in the pixel areas through Inkjet printing, severe light leakage is generated at the pixel areas disposed on the edge.

Therefore, there is a need for flat panel displays that reduce the amount of light leakage from the edge.

The information disclosed in this Background section is only for the enhancement of understanding of the background of the invention. It therefore may contain information that does not constitue prior art that is already known in this country to a person of ordinary skill in the art.

SUMMARY

In accordance with some embodiments of the invention, a flat panel display is disclosed that substantially reduces the amount of light leakage at first pixel areas and final pixel areas that are disposed on the edge of the display. According to some embodiments of the present invention, a liquid crystal display can include a lower panel having a first pixel area including a first pixel electrode and a first light leakage preventing member; a final pixel area including a second pixel electrode and a second light leakage preventing member; and middle pixel areas arranged between the first pixel area and the final pixel area, the middle pixel areas each including a first middle pixel electrode and a second middle pixel electrode.

In some embodiments, the second pixel electrode may be larger than the first pixel electrode, and the second light leakage preventing member may be smaller than the first light leakage preventing member. The size of the first light leakage preventing member may be the same as that of the second pixel electrode, and the size of the second light leakage preventing member may be the same as that of the first pixel electrode.

In some embodiments, a light blocking member disposed between the pixel areas and including an organic material having black pigments may be further included. The first light leakage preventing member and the second light leakage preventing member may be formed with the same material as the light blocking member.

In some embodiments, the liquid crystal display may further include a substrate, a partition disposed on the substrate and enclosing the first, final, and middle pixel areas, a color filter disposed inside the partition, and an insulating layer disposed on the partition and the color filter, wherein the first light leakage preventing member and the second light leakage preventing member may be disposed on the insulating layer.

In some embodiments, the liquid crystal display may further include a substrate, a partition disposed on the substrate and enclosing the first, final, and middle pixel areas, a color filter disposed inside the partition, and an insulating layer disposed on the partition and the color filter, and the first light leakage preventing member and the second light leakage preventing member are disposed on the insulating layer.

In some embodiments, the liquid crystal display may further include a driving circuit unit disposed between the pixel areas and including at least one transistor. The first light leakage preventing member and the second light leakage preventing member may be formed with the same layer as the drain electrode or the source electrode of the transistor. The first light leakage preventing member and the second light leakage preventing member may be formed using the same material as the drain electrode or the source electrode. The transistor may include a gate electrode, a gate insulating layer disposed on the gate electrode, a semiconductor pattern overlapping the gate electrode on the gate insulating layer, a drain electrode disposed on the semiconductor pattern, a source electrode disposed on the semiconductor pattern, and ohmic contact layers disposed between the drain electrode and the semiconductor pattern, and the source electrode and the semiconductor pattern. A passivation layer disposed on the transistor and the gate insulating layer may be further included, and the first light leakage preventing member and the second light leakage preventing member may be disposed between the gate insulating layer and the passivation layer.

In some embodiments, the first light leakage preventing member and the second light leakage preventing member may be disposed with the same layer as the gate electrode of the transistor. In addition, the first light leakage preventing member and the second light leakage preventing member may include the same material as the gate electrode of the transistor. The liquid crystal display may further include a storage electrode line disposed with the same layer as the gate electrode, and the first light leakage preventing member and the second light leakage preventing member may be coupled to the storage electrode line.

In some embodiments, the transistor may include a substrate, a gate electrode disposed on the substrate, a gate insulating layer disposed on the gate electrode, a semiconductor pattern overlapping the gate electrode on the gate insulating layer, a drain electrode disposed on the semiconductor pattern, a source electrode disposed on the semiconductor pattern, and ohmic contact layers disposed between the drain electrode and the semiconductor pattern, and the source electrode and the semiconductor pattern, and the first light leakage preventing member and the second light leakage preventing member, may be disposed between the substrate and the gate insulating layer.

In some embodiments, the liquid crystal display may further include a liquid crystal layer disposed on the lower panel, and an upper panel disposed on the liquid crystal layer and having a common electrode, wherein the first light leakage preventing member and the second light leakage preventing member include a transparent electrode material, and a voltage difference between the common electrode and the first light leakage preventing member, and the common electrode and the second light leakage preventing member, is "0". The common electrode may be electrically coupled to the first light leakage preventing member, and the common electrode may be electrically coupled to the second light leakage preventing member.

In some embodiments, the lower panel may include a substrate, a partition disposed on the substrate and corresponding to the outer of the pixel areas, a color filter disposed inside the partition, and an insulating layer disposed on the partition and the color filter, and the first light leakage preventing member and the second light leakage preventing member may be disposed on the insulating layer.

The first pixel area, the middle pixel areas, and the final pixel area may be sequentially arranged in all pixel columns. At least two first light leakage preventing members may be coupled to each other, and at least two second light leakage preventing members may be coupled to each other. The first light leakage preventing members may be integrally formed, and the second light leakage preventing members may be integrally formed. Accordingly, the first light leakage preventing member and the second light leakage preventing member may be disposed at the first pixel area and the final pixel area that are disposed on the edge. Accordingly, the light leakage may be effectively prevented at the edge of the pixel area. Also, in some embodiments, the neighboring first light leakage preventing members can be coupled to each other, or the neighboring second light leakage preventing members can be coupled to each other, such that the region for preventing the light leakage is extended, thereby increasing the light leakage preventing efficiency.

These and other embodiments are further discussed below with respect to he following figures.

DETAILED DESCRIPTION

Exemplary embodiments of the present invention will be hereinafter described in detail with reference to the accompanying drawings. The structural shapes, sizes, ratios, numbers, etc. are schematically illustrated in the accompanying drawings such that they may be altered more or less. The drawings are shown from the viewpoint of observation such that the direction or location of view in the drawings may be variously changed, depending upon the position of the observer. Even when reference is made to different elements, like reference numerals may be used to designate those elements. When the terms "include," "have," "consist of," or the like are used, the relevant subject may include other parts unless the term "only" is used to define the contents thereof.

When explanation is made by way of a singular term, it may be interpreted in a plural manner as well as in a singular manner. Even when the numerical values, shapes, size comparisons, positional relations, etc. are not explained with the adverb "about" or "substantially," they may be so interpreted to include the common error ranges. Even when the terms of "after," "before," "and," "here," "subsequently," or the like are introduced, they are not meant to define temporal sequences. The terms of "the first," "the second," ..., etc. are used only for convenience in distinction selectively, commutatively, or repeatedly, and are not meant to be read in any defined manner. It will be understood that when an element is referred to as being "on," "over," "above," "below," or "beside" another element, it can be directly on the other element or one or more intervening elements may also be present between the two elements. When the connective "or" is used to connect two elements, it is meant to indicate the respective elements and a combination thereof, but when the quantifier "any one of" is attached to the connective, it is meant to indicate only the respective elements.

Figure 1:
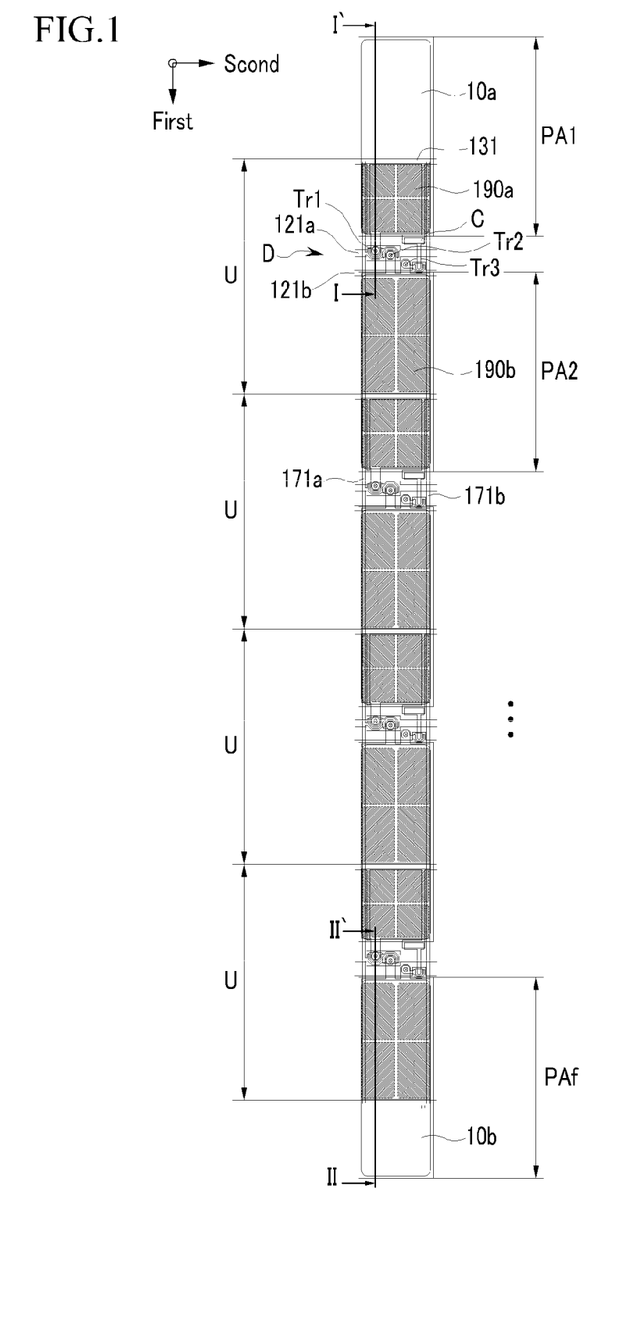
FIG. 1 shows a top plan view of a lower panel of a liquid crystal display according to an exemplary embodiment of the present invention.
Figure 2:
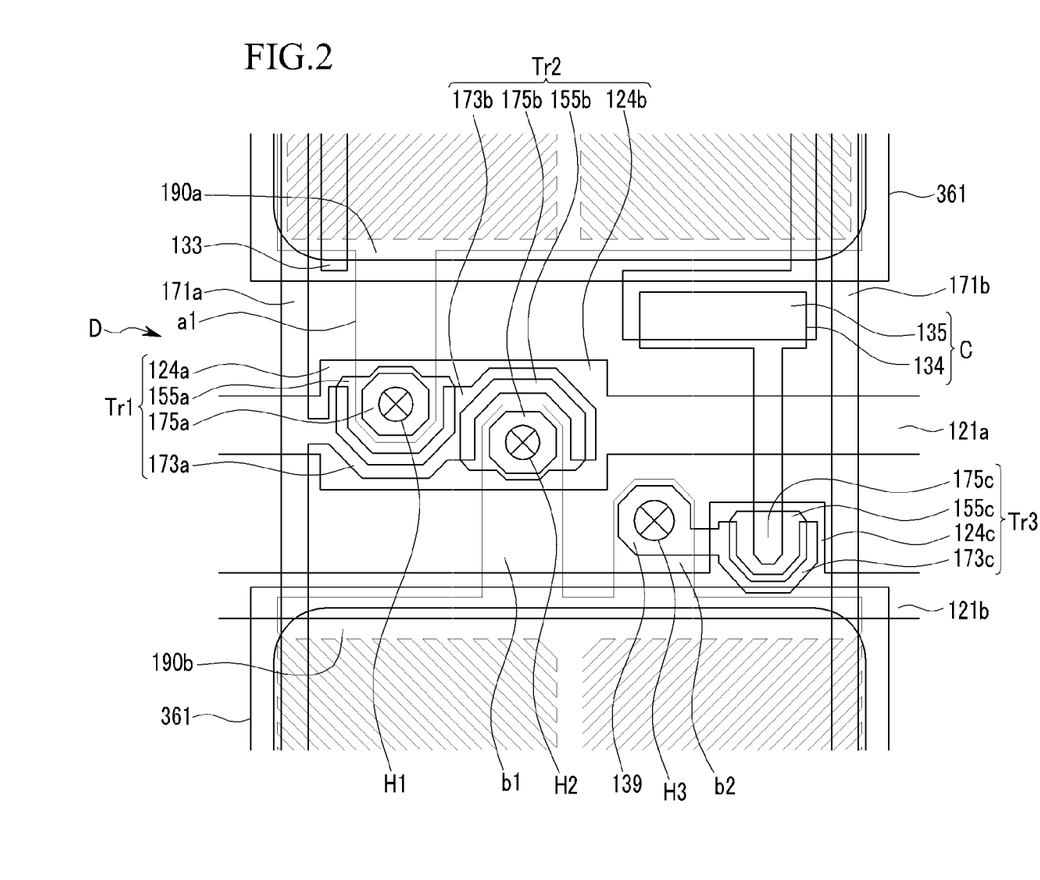
FIG. 2 shows an enlarged view of a driving circuit unit shown in FIG. 1.
Figure 3:
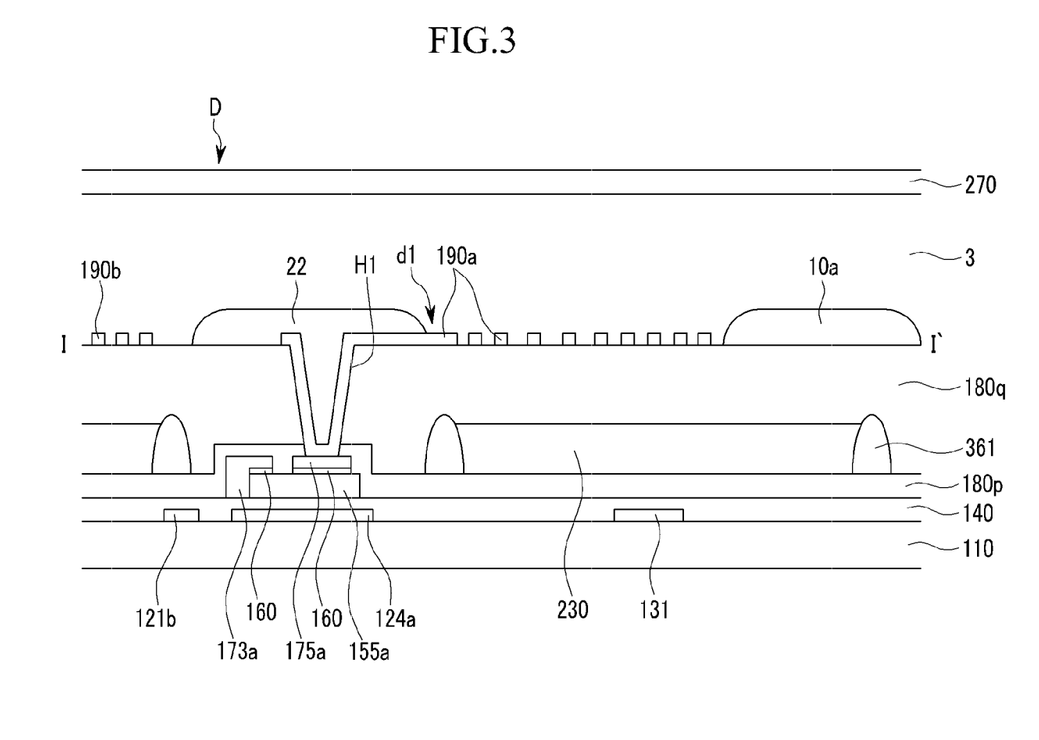
FIG. 3 shows a cross-sectional view taken along the line I-I' of FIG. 1.
Figure 4:
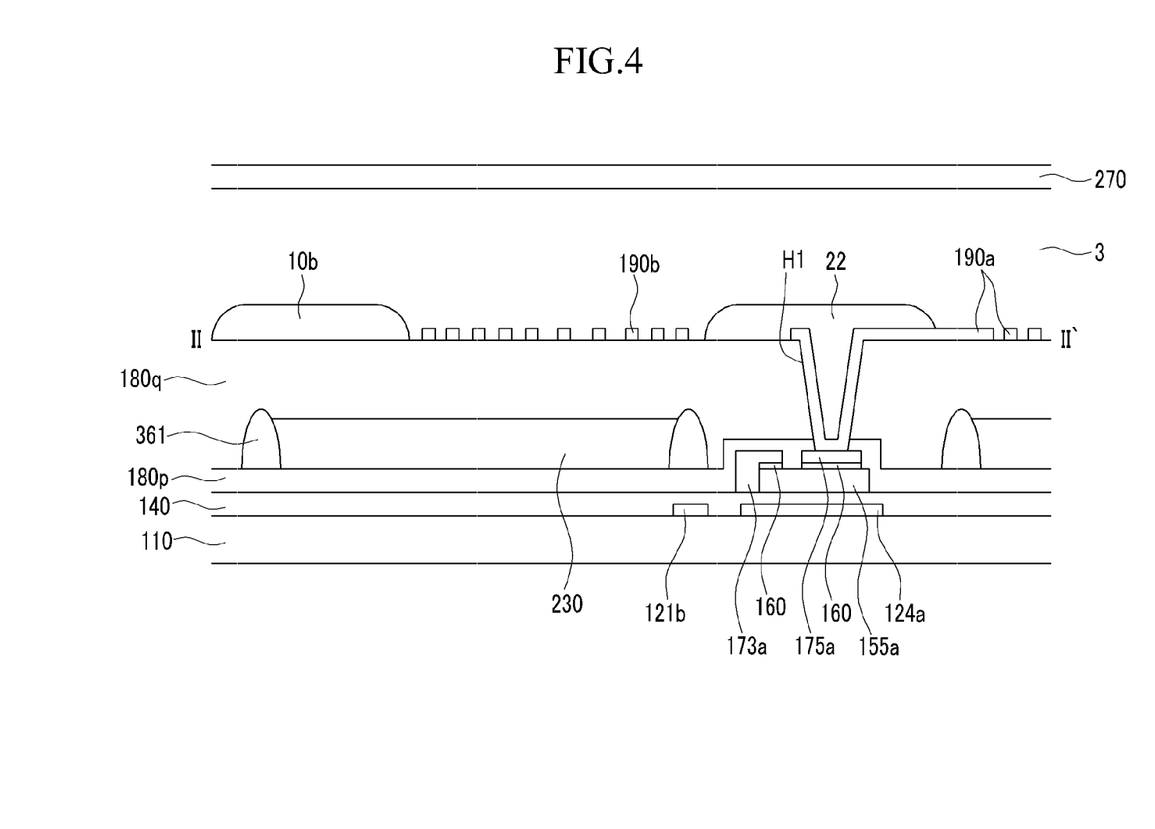
FIG. 4 shows a cross-sectional view taken along the line II-IP of FIG. 1.

FIG. 1 shows a top plan view of a lower panel of a liquid crystal display according to some embodiments of the present invention. FIG. 2 shows an enlarged view of a driving circuit unit such as that shown in FIG. 1. FIG. 3 shows a cross-sectional view taken along the line I-I' of FIG. 1. FIG. 4 shows a cross-sectional view taken along the line II-IP of FIG. 1. Amongst other elements, FIGS. 1-4 show a liquid crystal layer 3 (FIGS. 3 and 4), a first light leakage preventing member 10a (FIGS. 1 and 3), a second light leakage preventing member 10b (FIGS. 1 and 4), a substrate 110 (FIGS. 3 and 4), a first gate electrode 124a (FIGS. 2-4), a storage electrode line 131 (FIG. 3), a storage electrode 133 (FIG. 2), a gate insulating layer 140 (FIGS. 3 and 4), a first semiconductor pattern 155a (FIGS. 2-4), an ohmic contact layer 160 (FIGS. 3 and 4), a first source electrode 173a (FIGS. 2-4), a first drain electrode 175a (FIGS. 2-4), a passivation layer 180p (FIGS. 3 and 4), an insulating layer 180q (FIGS. 3 and 4), a first pixel electrode 190a (FIGS. 1-4), a second pixel electrode 190b (FIGS. 1-4), a color filter 230 (FIGS. 3 and 4), a common electrode 270 (FIGS. 3 and 4), and a partition 361 (FIGS. 3 and 4).

Referring to FIG. 1, a pixel as one formation unit U includes a first pixel electrode 190a, a second pixel electrode 190b that is larger than the first pixel electrode 190a, and a driving circuit unit D disposed between the first pixel electrode 190a and the second pixel electrode 190b, the driving unit D including a transistor Tr (Tr1 and Tr2 are shown). Formation unit U is continuously formed according to one direction by Inkjet printing.

As shown in FIG. 1, a region of substantially the same size where the pixel electrodes are disposed is defined as a pixel area PA. In the case where the first pixel electrode 190a, the second pixel electrode 190b, and the driving circuit unit D are formed as one formation unit U by using the Inkjet printing, pixel areas $PA_2$, through $PA_{f-1}$, which are disposed on the middle position between the first pixel area $PA_1$ where the first pixel shown in FIG. 1 is started and the final pixel area $PA_f$ where the final pixel is ended, include first pixel electrode 190a and second pixel electrode 190b. However, as shown in FIG. 1, the first pixel area $PA_1$ only includes first pixel electrode 190a and final pixel area $PA_f$ only includes second pixel electrode 190b.

According to some embodiments of the present invention, a light leakage preventing member can be disposed in the portion where the first pixel electrode 190a is not occupied in the first pixel area $PA_1$, where the first pixel is started, and the portion where the second pixel electrode 190b is not occupied in the final pixel area PA$_f$, where the final pixel is ended. Further, for convenience of explanation only, five pixel areas PA are shown in FIG. 1, however there may be any number of pixel areas PA and there may be substantially more than five.

As shown in FIGS. 3 and 4, driving circuit unit D is disposed on a substrate 110. As shown in FIG. 2, in some embodiments, driving circuit unit D can include a first transistor Tr$_1$, a second transistor Tr$_2$, a third transistor Tr$_3$, and a down capacitor C for realizing a charge sharing method, however it is not limited thereto. For example, driving circuit unit D may include a charge pump, which would utilize a different structure.

Referring to FIG. 2, driving circuit unit D can include a storage electrode line 131, a storage electrode 133, a capacitor lower electrode 134, a first gate line 121a, a first gate electrode 124a, a second gate electrode 124b, a third gate electrode 124c, and a second gate line 121b. As shown in FIGS. 3 and 4, driving circuit unit D is disposed on substrate 110. As shown in FIGS. 3 and 4, storage electrode line 131, first gate line 121a, and second gate line 121b are separated in a first direction, defined as shown in FIG. 1, and are sequentially arranged. Also, storage electrode line 131, first gate line 121a, and second gate line 121b are extended in a second direction intersecting the first direction, as defined in FIG. 1.

Storage electrode 133 may be a pair and extends from storage electrode line 131 in the first direction. The capacitor lower electrode 134 is extended from the storage electrode 133 in the second direction.

As illustrated in FIG. 2, first gate electrode 124a and the second gate electrode 124b are coupled to first gate line 121a. A portion of first gate line 121a having a wide width may be used as first gate electrode 124a and as second gate electrode 124b. Third gate electrode 124c is coupled to second gate line 121b. A portion of second gate line 121b having a wide width may be used as third gate electrode 124c.

As shown in FIGS. 3 and 4, a gate insulating layer 140 is formed on storage electrode line 131, storage electrode 133, capacitor lower electrode 134, first gate line 121a, first gate electrode 124a, second gate electrode 124b, third gate electrode 124c, and second gate line 121b. As shown in FIG. 2, a first semiconductor pattern 155a, a second semiconductor pattern 155b, and a third semiconductor pattern 155c are respectively disposed on first gate electrode 124a, second gate electrode 124b, and third gate electrode 124c on gate insulating layer 140.

As shown in FIG. 2, a first data line 171a is disposed on the left side of the pixel area PA on gate insulating layer 140. A second data line 171b is disposed on the right side of the pixel area PA on gate insulating layer 140. First data line 171a is extended in the first direction and is disposed further outside than first and second semiconductor patterns 155a and 155b. Second data line 171b is disposed at the right side of the pixel area PA on gate insulating layer 140. Second data line 171b is extended in the first direction.

As shown in FIG. 2, a first source electrode 173a is extended from first data line 171a. As shown in FIG. 3, first source electrode 173a partially overlaps first semiconductor pattern 155a. A second source electrode 173b is extended from first source electrode 173a, thereby partial overlapping second semiconductor pattern 155b. A third source electrode 173c partially overlaps third semiconductor pattern 155c.

As shown in FIG. 3, first drain electrode 175a is separated from first source electrode 173a on first semiconductor pattern 155a. As illustrated in FIG. 2, second drain electrode 175b is separated from the second source electrode 173b on second semiconductor pattern 155b. A third drain electrode 175c is separated from third source electrode 173c on the third semiconductor pattern 155c.

As shown in FIG. 2, a contact region 139 has a shape extending from third source electrode 173c. Also, a capacitor upper electrode 135 is extended from the third drain electrode 175c and overlaps capacitor lower electrode 134.

As shown in FIGS. 3 and 4, a passivation layer 180p is formed on the above-described structures. Also, an insulating layer 180q is formed on passivation layer 180p. Insulating layer 180q and passivation layer 180p have a first hole H$_1$ (shown in FIGS. 2 through 4), a second hole H$_2$ (shown in FIG. 2), and a third hole H$_3$ (shown in FIG. 2) respectively exposing a first drain electrode 175a, a second drain electrode 175b, and contact region 139, respectively.

As shown in FIGS. 3 and 4, first pixel electrode 190a and second pixel electrode 190b are disposed on insulating layer 180q. As shown in FIGS. 2 through 4, first pixel electrode 190a and second pixel electrode 190b are disposed between first data line 171a and second data line 171b, and are opposite to each other via first and second semiconductor patterns 155a and 155b.

As shown in FIGS. 2 and 3, first pixel electrode 190a has an extension a1. Extensional of first pixel electrode 190a is coupled to first drain electrode 175a through first hole H$_1$. As shown in FIG. 2, second pixel electrode 190b includes a first extension b1 and a second extension b2. First extension b1 of second pixel electrode 190b is coupled to the second drain electrode 175b through second hole H$_2$. Second extension b2 of second pixel electrode 190b is coupled to the contact region 139 through third hole H$_3$.

As shown in FIG. 2, first gate electrode 124a, first source electrode 173a, first drain electrode 175a, and first semiconductor pattern 155a form first transistor Tr$_1$. Second gate electrode 124b, second source electrode 173b, second drain electrode 175b, and second semiconductor pattern 155b form second transistor Tr$_2$. Third gate electrode 124c, third source electrode 173c, third drain electrode 175c, and third semiconductor pattern 155c form third transistor Tr$_3$. Capacitor lower electrode 134, gate insulating layer 140, and capacitor upper electrode 135 form a down capacitor C.

Third transistor T3 may realize a charge sharing effect between first pixel electrode 190a and second pixel electrode 190b. Third transistor Tr$_3$ is turned on in a state where first and second transistors Tr$_1$ and Tr$_2$ are turned on, and charges are moved from second pixel electrode 190b to down capacitor C. In that case, the voltage of first pixel electrode 190a is maintained higher than the voltage of second pixel electrode 190b. Accordingly, problems such as lateral visibility may be solved through creating a voltage difference between first pixel electrode 190a and second pixel electrode 190b.

Referring to FIGS. 1 and 3, first transistor Tr$_1$ of driving circuit unit D includes first gate electrode 124a on substrate 110, gate insulating layer 140 on first gate electrode 124a, first semiconductor pattern 155a overlapping first gate electrode 124a on gate insulating layer 140, first drain electrode 175a on first semiconductor pattern 155a, first source electrode 173a on first semiconductor pattern 155a, an ohmic contact layer 160 between first drain electrode 175a and first semiconductor pattern 155a, first source electrode 173a, and first semiconductor pattern 155a. Passivation layer 180p is disposed on substrate 110 and driving circuit unit D. Also, a partition 361 is disposed on passivation layer 180p. Partition 361 is disposed to correspond to the outer part of the pixel area PA. That is, partition 361 encloses pixel area PA. A color filter 230 is also formed in pixel area PA and disposed inside partition 361.

As shown in FIGS. 3 and 4, insulating layer 180q is formed on passivation layer 180p, color filter 230, and partition 361. First pixel electrode 190a is coupled to first drain electrode 175a of first transistor Tr$_1$ by passing through insulating layer 180q. Passivation layer 180p is disposed to be extended to the portion of the first pixel area PA$_1$ on insulating layer 180q.

Also, as shown in FIG. 3, a first light leakage preventing member 10a is disposed on the portion of insulating layer 180q in first pixel area PA$_1$ where first pixel electrode 190a does not exist. In some embodiments, first light leakage preventing member 10a includes an organic material include black pigments Here, the size of the first light leakage preventing member 10a may be substantially the same as that of second pixel electrode 190b.

Also shown in FIG. 3, second pixel electrode 190b is extended to the portion of second pixel area PA$_2$ on insulating layer 180q. Also, first pixel electrode 190a is positioned at the portion where second pixel electrode 190b is not disposed among the portion of insulating layer 180q corresponding to second pixel area PA$_2$. That is, first pixel area PA$_1$ includes first pixel electrode 190a and first light leakage preventing member 10a shown in FIG. 3, and second pixel area PA$_2$ includes second pixel electrode 190b shown in FIG. 3, as well as first pixel electrode 190a of second pixel area PA$_2$ that is not shown in FIG. 3. As shown in FIGS. 3 and 4, a light blocking member 22 on insulating layer 180q is disposed in driving circuit unit D between pixel areas PA. Light blocking member 22 may include substantially the same material as first light leakage preventing member 10a. Light blocking member 22 may be positioned on the portion of first pixel electrode 190a coupled to first drain electrode 175a of first transistor Tr$_1$ above driving circuit unit D. In this case, first pixel electrode 190a may fill the contact hole of insulating layer 180q.

Referring to FIGS. 1 and 4, first pixel electrode 190a and second pixel electrode 190b are disposed on middle pixel areas PA$_2$, through PA$_{f-1}$ between first pixel area PA$_1$ and final pixel area PA$_f$. However, second pixel electrode 190b is disposed to be extended to the portion of the final pixel area PA$_f$ on insulating layer 180q in final pixel area PA$_f$. Also, a second light leakage preventing member 10b, which may be made of an organic material including black pigments, is disposed on the portion where second pixel electrode 190b does not exist on insulating layer 180q corresponding to final pixel area PA$_f$. In some embodiments, the size of second light leakage preventing member 10b may be smaller than that of first light leakage preventing member 10a. For example, the size of second light leakage preventing member 10b may be substantially the same as that of first pixel electrode 190a.

Figure 5:
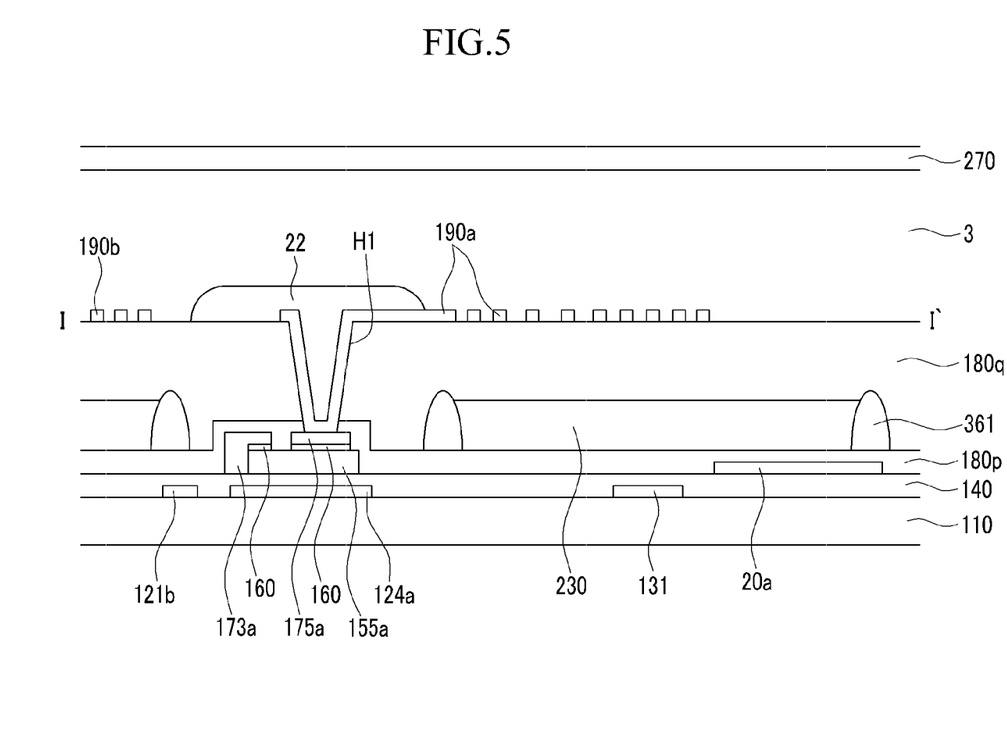
FIGS. 5 and 6 illustrate cross-sectional views of a lower panel of a liquid crystal display according to some embodiments of the present invention.
Figure 6:
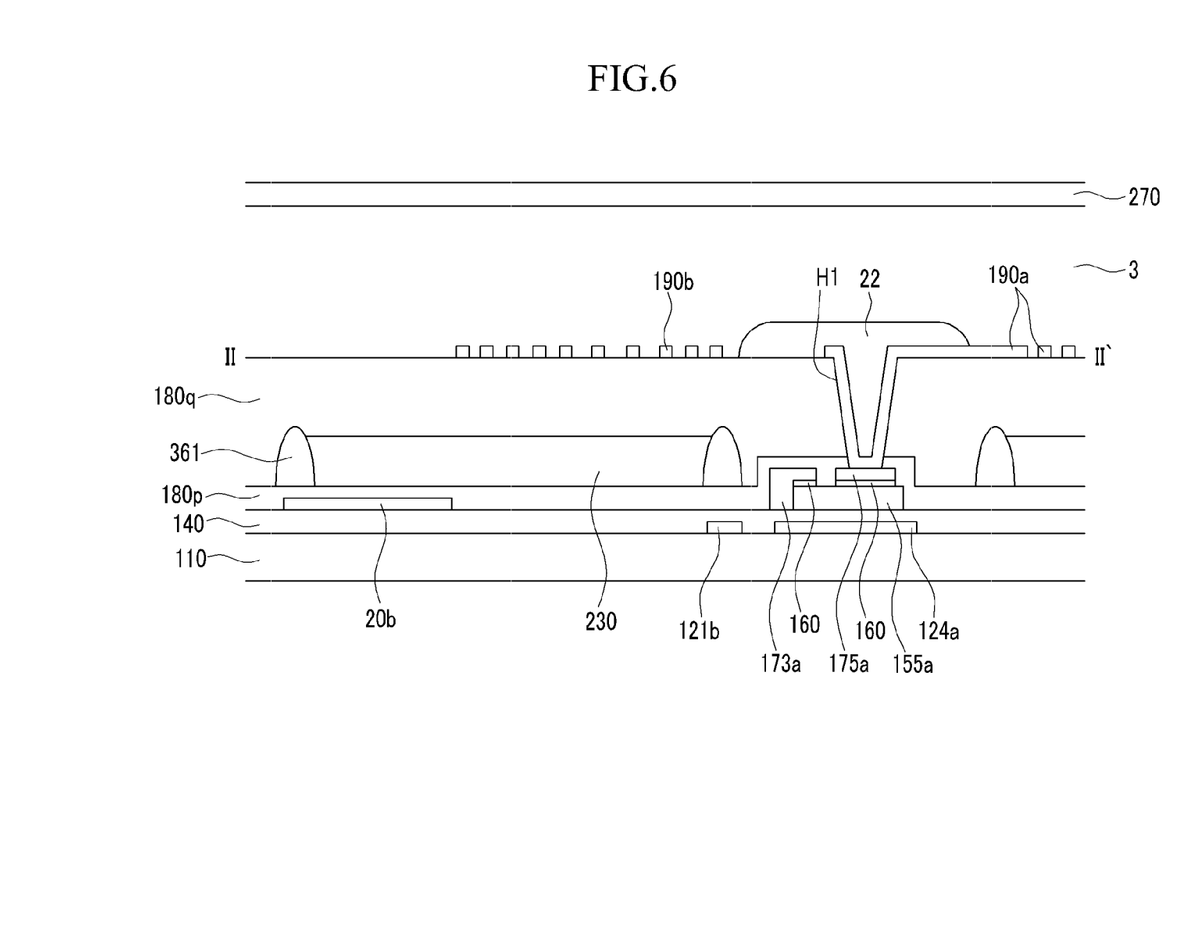

FIGS. 5 and 6 are cross-sectional views of a lower panel of a liquid crystal display according to some embodiments of the present invention. FIGS. 5 and 6 are cross-sectional view taken along the lines I-I' and II-IP shown in FIG. 1. As shown in FIGS. 5 and 6, a lower panel of a liquid crystal display according to embodiments as shown is substantially the same as the embodiments illustrated in FIGS. 1 through 4, except for the light leakage preventing member. Accordingly, the same components are indicated by the same reference numerals, and the description thereof is omitted.

Referring to FIG. 5, a first light leakage preventing member 20a is disposed in first pixel area PA$_1$ under the portion where the first pixel electrode 190a does not exist. First light leakage preventing member 20a is formed on insulating layer 140 and insulating layer 180q is then deposited over insulating layer 140 and first leakage preventing member 20a. Here, the size of the first light leakage preventing member 20a may be substantially the same as that of second pixel electrode 190b.

First light leakage preventing member 20a may be formed through the same process as drain electrode 175 or source electrode 173 of one transistor Tr included in driving circuit unit D. In this case, first light leakage preventing member 20a includes the same material as drain electrode 175 or the source electrode 173, and is disposed between gate insulating layer 140 and passivation layer 180p like drain electrode 175 or source electrode 173.

In some embodiments, first light leakage preventing member 20a may be formed through the same process as first drain electrode 175a or first source electrode 173a of first transistor Tr$_1$. As another example, first light leakage preventing member 20a may be formed through the same process as second drain electrode 175b or second source electrode 173b of second transistor Tr$_2$. As another example, first light leakage preventing member 20a may be formed through the same process as third drain electrode 175c or third source electrode 173c of third transistor Tr$_1$, and the first light leakage preventing member 20a may be separated from drain electrode 175 and source electrode 173.

Referring to FIG. 6, a second light leakage preventing member 20b is disposed in pixel area PA$_f$ on the portion where the second pixel electrode 190b is not positioned. Here, the size of the second light leakage preventing member 20b may be smaller than that of the first light leakage preventing member 20a. In some embodiments, the size of the second light leakage preventing member 20b may be substantially the same as that of the first pixel electrode 190a.

The second light leakage preventing member 20b may be formed through the same process as that forming drain electrode 175 or that forming source electrode 173 of one transistor Tr included in driving circuit unit D. In this case, second light leakage preventing member 20b includes the same material as drain electrode 175 or source electrode 173. Further, second light leakage preventing member 20b is disposed between gate insulating layer 140 and passivation layer 180p like drain electrode 175 or source electrode 173.

In some embodiments, second light leakage preventing member 20b may be formed through the same process as first drain electrode 175a or first source electrode 173a of first transistor Tn. In some embodiments, second light leakage preventing member 20b may be formed through the same process as second drain electrode 175b or second source electrode 173b of second transistor Tr$_2$. In some embodiments, second light leakage preventing member 20b may be formed through the same process as third drain electrode 175c or third source electrode 173c of third transistor Tr$_1$. Also, second light leakage preventing member 20b may be separated from drain electrode 175 and source electrode 173.

Figure 7:
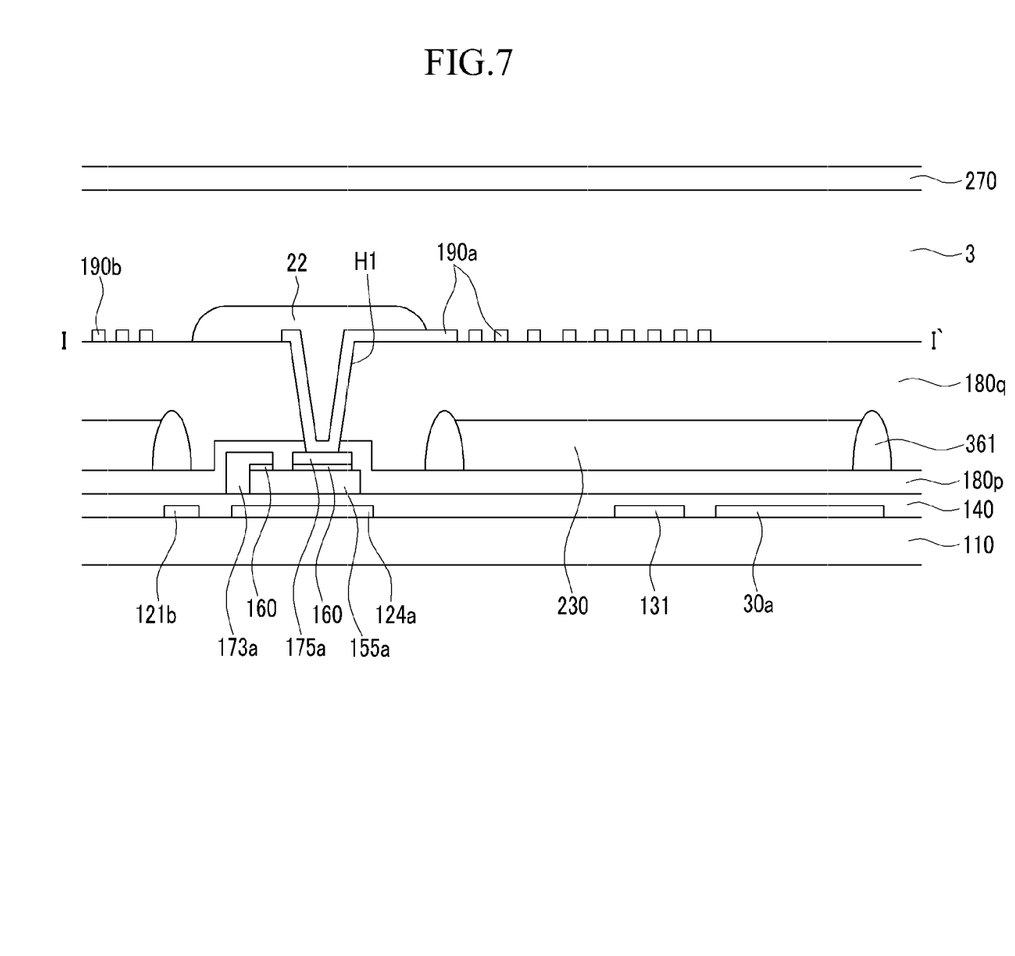
FIGS. 7 and 8 illustrate cross-sectional views of a lower panel of a liquid crystal display according to some embodiments of the present invention.
Figure 8:
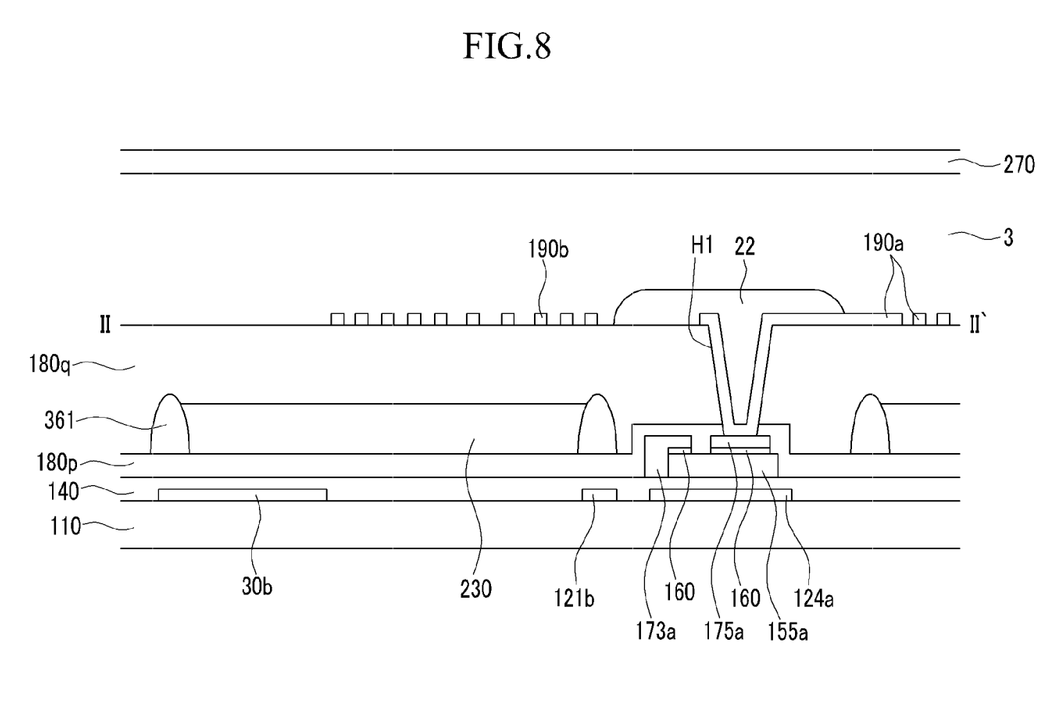

FIGS. 7 and 8 are cross-sectional views of a lower panel of a liquid crystal display according to some embodiments of the present invention. Here, FIGS. 5 and 6 are cross-sectional view taken along the lines I-I' and II-IP shown FIG. 1. The lower panel of the liquid crystal display shown in FIGS. 7 and 8 is substantially the same as that shown in FIGS. 1 to 4, except for the light leakage preventing member. Accordingly, the same components are indicated by the same reference numerals, and the description thereof is omitted.

Referring to FIG. 7, a first light leakage preventing member 30a is disposed on first pixel area PA$_1$ in the portion where first pixel electrode 190a does not exist. Here, the size of the first light leakage preventing member 30a may be substantially the same as that of second pixel electrode 190b. First light leakage preventing member 30a may be formed through the same process as that used to form gate electrode 124 of one transistor Tr included in driving circuit unit D. In this case, first light leakage preventing member 30a includes the same material as gate electrode 124, and is disposed between gate insulating layer 140 and passivation layer 180$p$, like gate electrode 124. In some embodiments, first light leakage preventing member 30$a$ may be coupled to gate electrode 124, or first light leakage preventing member 30$a$ may be separated from gate electrode 124.

In some embodiments, first light leakage preventing member 30$a$ may be formed through the same process as that forming first gate electrode 124$a$ of first transistor Tn. In some embodiments, first light leakage preventing member 30$a$ may be formed through the same process as that forming second gate electrode 124$b$ (referring to FIG. 2) of second transistor Tr$_2$. In some embodiments, first light leakage preventing member 30$a$ may be formed through the same process as that forming third gate electrode 124$c$ (referring to FIG. 2) of third transistor Tr$_1$. Also, first light leakage preventing member 30$a$ may be separated or electrically coupled with gate electrodes 124.

Further, in some embodiments, storage electrode line 131 may be formed with the same layer as first gate electrode 124$a$ in the process of forming first gate electrode 124$a$. Here, storage electrode line 131 may be coupled to first light leakage preventing member 30$a$.

Referring to FIG. 8, a second light leakage preventing member 30$b$ is disposed in pixel area PA$_f$ on the portion where second pixel electrode 190$b$ is not positioned. Here, the size of second light leakage preventing member 30$b$ may be smaller than that of first light leakage preventing member 30$a$. For example, the size of second light leakage preventing member 30$b$ may be substantially the same as that of first pixel electrode 190$a$. Second light leakage preventing member 30$b$ may be formed through the same process as that forming gate electrode 124 of one transistor Tr included in driving circuit unit D. In this case, second light leakage preventing member 30$b$ includes the same material as gate electrode 124. Further, second light leakage preventing member 30$b$ is disposed between gate insulating layer 140 and passivation layer 180$p$ like gate electrode 124. Also, second light leakage preventing member 30$b$ may or may not be coupled to gate electrode 124.

In some embodiments, second light leakage preventing member 30$b$ may be formed through the same process as that forming first gate electrode 124$a$ of first transistor Tn. In some embodiments, second light leakage preventing member 30$b$ may be formed through the same process as that forming second gate electrode 124$b$ (referring to FIG. 2) of second transistor Tr$_2$. In some embodiments, second light leakage preventing member 30$b$ may be formed through the same process as that forming third gate electrode 124$c$ (referring to FIG. 2) of third transistor Tr$_1$. Also, second light leakage preventing member 30$b$ may be separated from the gate electrodes 124 or may be coupled to gate electrodes 124.

Further, in some embodiments storage electrode line 131 may be formed with the same layer as first gate electrode 124$a$ in the process forming first gate electrode 124$a$. In some embodiments, storage electrode line 131 may be coupled to second light leakage preventing member 30$b$.

Figure 9:
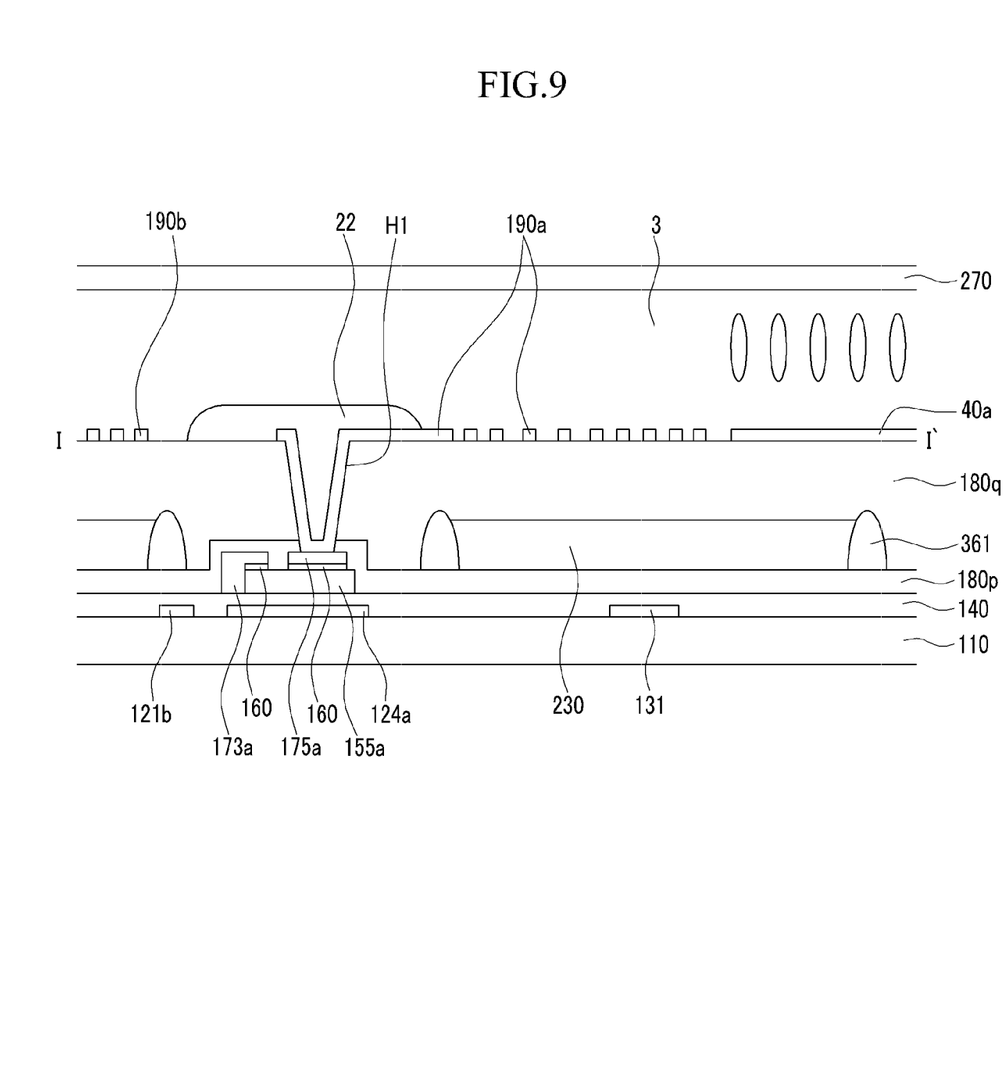
FIGS. 9 and 10 illustrate cross-sectional views of a liquid crystal display according to some embodiments of the present invention.
Figure 10:
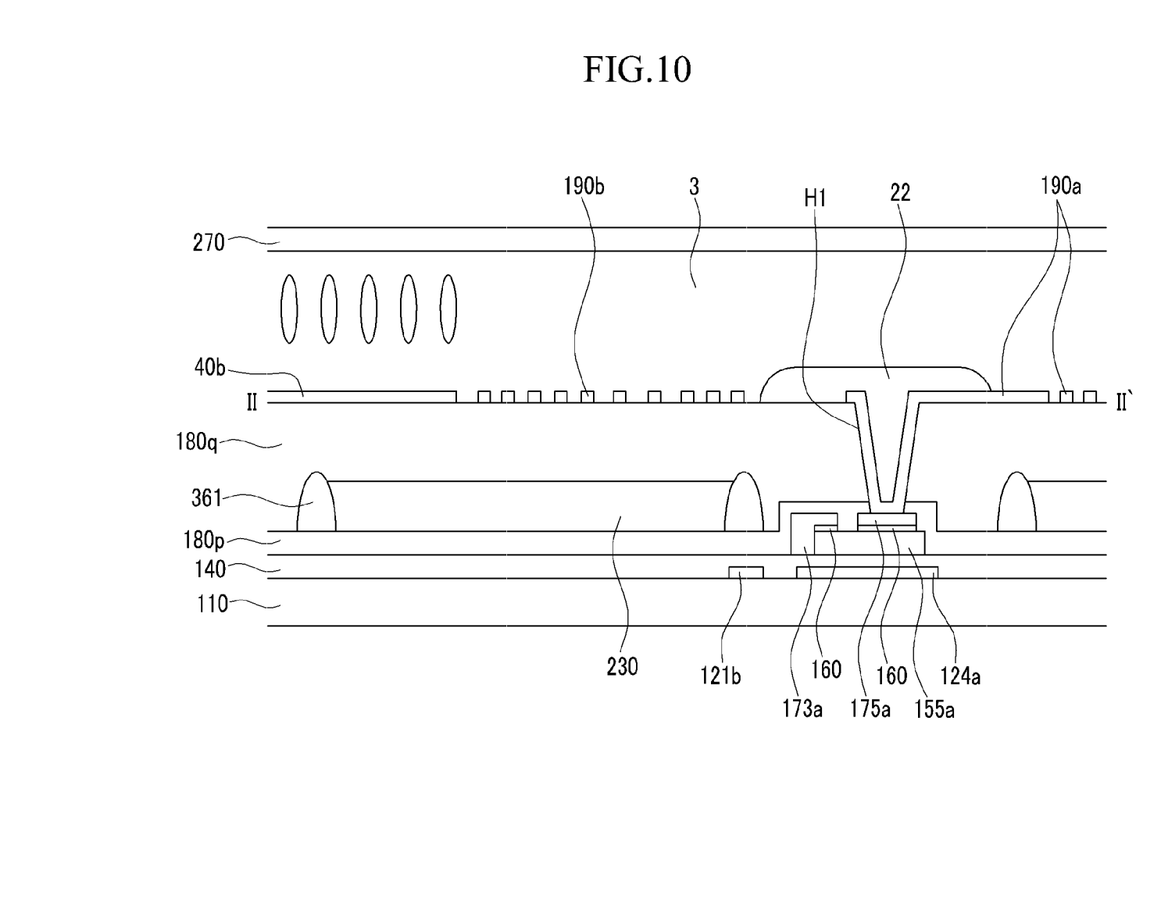

FIGS. 9 and 10 show cross-sectional views of a liquid crystal display according to some embodiments of the present invention. FIGS. 9 and 10 are cross-sectional view taken along the lines I-I' and II-II' shown FIG. 1, respectively. A lower panel of a liquid crystal display shown in FIGS. 9 and 10 is substantially the same as that shown in FIGS. 1 to 4, except for the light leakage preventing member. Accordingly, the same components are indicated by the same reference numerals, and the description thereof is omitted. Also, FIGS. 9 and 10 show a liquid crystal layer 3 and an upper panel 270 for explanation of the operation of the light leakage preventing member as well as the lower panel of the liquid crystal display.

Referring to FIG. 9, a first light leakage preventing member 40$a$ is disposed on insulating layer 180$q$ in first pixel area PA$_1$ in the portion where first pixel electrode 190$a$ is not disposed. Here, the size of first light leakage preventing member 40$a$ may be substantially the same the as that of second pixel electrode 190$b$. First light leakage preventing member 40$a$ may include a transparent electrode material such as indium tin oxide (ITO).

An upper panel including a common electrode 270 is disposed to face the lower panel of the liquid crystal display. A liquid crystal layer 3 is disposed between common electrode 270 and layer 180$q$ of the lower panel of the liquid crystal display. Also, an alignment layer (not shown) may be disposed between the lower panel and the liquid crystal layer 3, and the upper panel and the liquid crystal layer 3.

Referring to FIG. 10, a second light leakage preventing member 40$b$ is disposed on the portion where the second pixel electrode 190$b$ is not disposed, on the portion of insulating layer 180$q$ in final pixel area PA$_f$. The size of second light leakage preventing member 40$b$ may be smaller than that of first light leakage preventing member 40$a$. For example, the size of second light leakage preventing member 40$b$ may be substantially the same as that of first pixel electrode 190$a$. Second light leakage preventing member 40$b$ may, for example, include a transparent electrode material such as ITO.

An upper panel including a common electrode 270 is disposed to face the lower panel of the liquid crystal display. The liquid crystal layer 3 is disposed between the common electrode 270 and the lower panel of the liquid crystal display. Also, an alignment layer (not shown) may be disposed between the lower panel and the liquid crystal layer 3, and the upper panel and the liquid crystal layer 3.

A voltage difference is not generated between the first light leakage preventing member 40$a$ and the common electrode 270. That is, the first light leakage preventing member 40$a$ may be electrically coupled to common electrode 270. In this case, the liquid crystal molecules of liquid crystal layer 3 are not inclined between the first light leakage preventing member 40$a$ and common electrode 270, thereby realizing the light leakage preventing effect.

Figure 11:
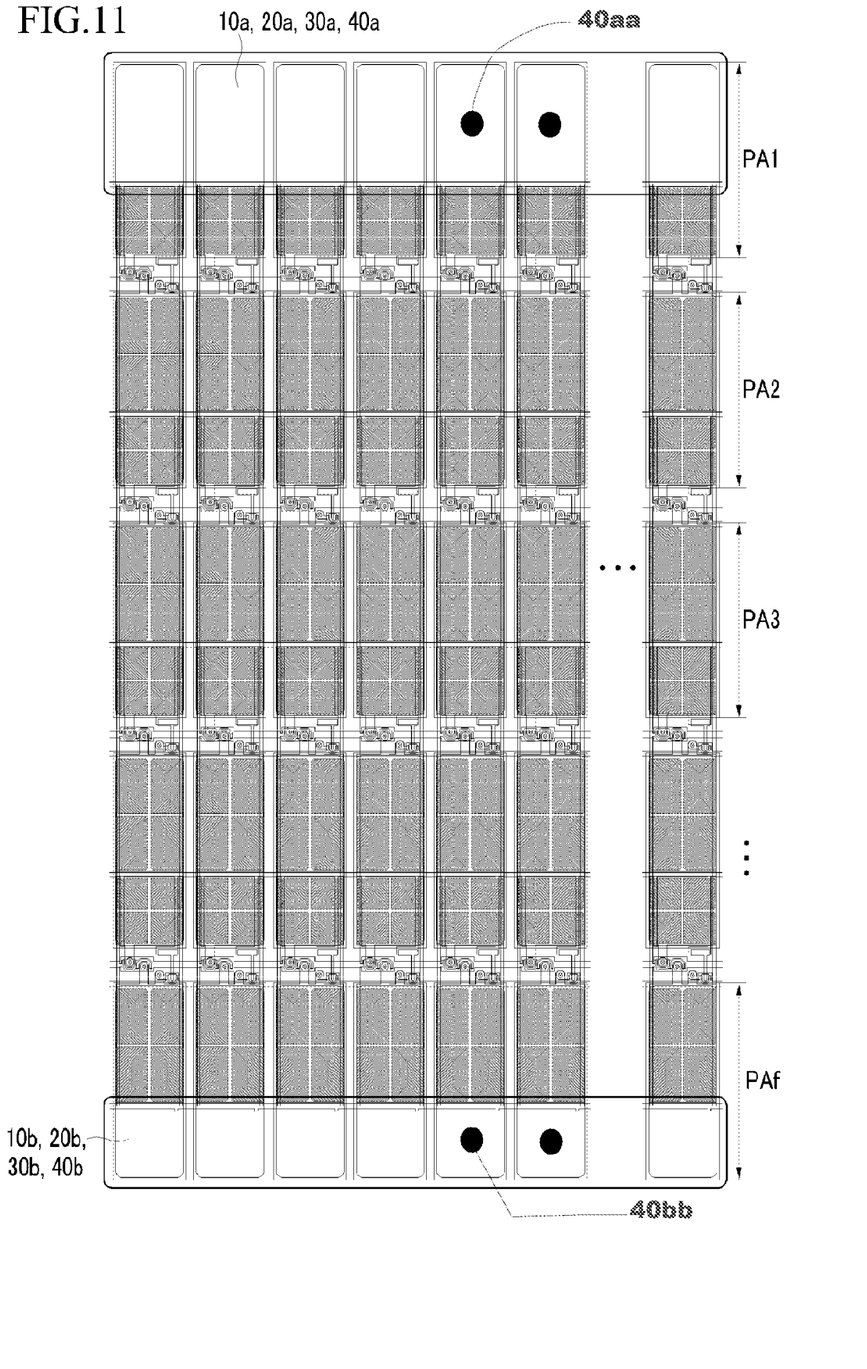
FIG. 11 shows a top plan view of an arrangement of pixel areas included in a lower panel of a liquid crystal display according to some embodiments of the present invention.

FIG. 11 shows a top plan view of pixel areas included in a lower panel of a liquid crystal display according to some embodiments of the present invention. Referring to FIG. 11, the pixel areas are arranged in the row direction and the column direction. Pixel areas of the same kind are arranged in the row direction, and the first pixel area PA$_1$, the middle pixel areas PA$_2$ through PA$_{f-1}$, and the final pixel area PA$_f$ are sequentially arranged in the column direction. That is, the first pixel area PA$_1$, the middle pixel areas PA$_2$ through PA$_{f-1}$, and the final pixel area PA$_f$ may be sequentially arranged in all pixel columns.

As described in FIGS. 1 to 11 the first pixel area PA$_1$ includes the first light leakage preventing members 10$a$, 20$a$, 30$a$, and 40$a$, and the final pixel area PA$_f$ includes the second light leakage preventing members 10$b$, 20$b$, 30$b$, and 40$b$. In some embodiments, at least two first light leakage preventing members 10$a$, 20$a$, 30$a$, and 40$a$ are coupled in the row direction. Also, at least two second light leakage preventing members 10$b$, 20$b$, 30$b$, and 40$b$ are coupled in the row direction. Further, the first light leakage preventing members 10$a$, 20$a$, 30$a$, and 40$a$ are integrally formed. Also, the second light leakage preventing members 10$b$, 20$b$, 30$b$, and 40$b$ are integrally formed. The structure in which the first light leakage preventing members 10a, 20a, 30a, and 40a, and the second light leakage preventing members 10b, 20b, 30b, and 40b are connected in the row direction has the extended area such that the light leakage may be efficiently prevented. For the case of the respective first and second leakage preventing members 40a and 40b of the embodiments of respective FIGS. 9 and 10, corresponding, to-the-common-electrode connection points 40aa and 40bb may be provided as shown by exemplary pairs of such to-the-common-electrode connection points 40aa and 40bb in FIG. 11 whereby the respective first and second leakage preventing members 40a and 40b are connected to the common electrode 270 and also to each other.

While this disclosure of invention has been provided in connection with what is presently considered to be practical exemplary embodiments, it is to be understood that the present teachings are not limited to the disclosed embodiments, but, on the contrary, they are intended to cover various modifications and equivalent arrangements included within the spirit and scope of the teachings.

What is claimed is:

1. A liquid crystal display comprising a lower panel, wherein the lower panel includes a display area that has opposed edges and that is longitudinally populated between its opposed edges by pixel areas of equal lengths, where a succession of the pixel areas extending longitudinally from a first to a second of the opposed edges comprises:
a first pixel area including in respective portions of its length, a first pixel electrode and a first light leakage preventing member, the first pixel area being proximate to the first of the opposed edges of the display area;
a final pixel area including in respective portions of its length, a second pixel electrode and a second light leakage preventing member, the second pixel area being proximate to the second of the opposed edges of the display area; and
middle pixel areas arranged between the first pixel area and the final pixel area, the middle pixel areas each respectively including in respective portions of its corresponding length, a respective first middle pixel electrode and a respective but electrically separate second middle pixel electrode but not an equivalent of either of the first and second light leakage preventing members.

2. The liquid crystal display of claim 1, wherein
the second pixel electrode is larger than the first pixel electrode, and
the second light leakage preventing member is smaller than the first light leakage preventing member.

3. The liquid crystal display of claim 2, wherein
the respective portion of the pixel area length occupied by the first light leakage preventing member is the same as that of the second pixel electrode, and
the respective portion of the pixel area length occupied by the second light leakage preventing member is the same as that of the first pixel electrode.

4. The liquid crystal display of claim 1, further comprising respective light blocking members disposed between successive ones of the pixel areas, each of the light blocking members including an organic material having a black pigment.

5. The liquid crystal display of claim 4, wherein
the first light leakage preventing member and the second light leakage preventing member are formed with the same material as the light blocking members.

6. The liquid crystal display of claim 5, further comprising:
a substrate;
a partition disposed on the substrate and enclosing the first, final, and middle pixel areas;
a color filter disposed inside the partition; and
an insulating layer disposed on the partition and the color filter,
wherein the first light leakage preventing member and the second light leakage preventing member are disposed on the insulating layer.

7. The liquid crystal display of claim 1, further comprising respective driving circuit units interposed between adjacent ones of the pixel areas, with each respective driving circuit unit including at least one transistor operatively coupled to control charging of a respective at least one and adjacent pixel electrode of the corresponding first and second pixel electrodes of the respective and adjacent ones of the pixel areas between which the respective driving circuit unit is interposed.

8. The liquid crystal display of claim 7, wherein
the first light leakage preventing member and the second light leakage preventing member are formed in a same layer as that of a drain electrode or a source electrode of an at least one of the transistors of the driving circuit units.

9. The liquid crystal display of claim 8, wherein
the first light leakage preventing member and the second light leakage preventing member are formed using the same material as the drain electrode or the source electrode.

10. The liquid crystal display of claim 9, wherein
the respective at least one transistors of the driving circuit units each includes a gate electrode, a gate insulating layer disposed on the gate electrode, a semiconductor pattern overlapping the gate electrode and disposed on the gate insulating layer, the said drain electrode disposed on the semiconductor pattern, the said source electrode disposed on the semiconductor pattern, and respective ohmic contact layers respectively disposed between the drain electrode and the semiconductor pattern, and between the source electrode and the semiconductor pattern,
a passivation layer is disposed on each of the respective at least one transistors and on the gate insulating layer, and
the first light leakage preventing member and the second light leakage preventing member are disposed under the passivation layer.

11. The liquid crystal display of claim 10, wherein
the first light leakage preventing member and the second light leakage preventing member are disposed in a same layer as that of the gate electrode of an at least one of the transistors.

12. The liquid crystal display of claim 11, wherein
the first light leakage preventing member and the second light leakage preventing member include the same material as the gate electrode of an at least one of the transistors.

13. The liquid crystal display of claim 12, further comprising
a storage electrode line disposed with the same layer as the gate electrode.

14. The liquid crystal display of claim 13, wherein
the first light leakage preventing member and the second light leakage preventing member are disposed between the substrate and the gate insulating layer.

15. The liquid crystal display of claim 1, further comprising:
a liquid crystal layer disposed on the lower panel; and an upper panel disposed on the liquid crystal layer and having a common electrode, wherein the first light leakage preventing member and the second light leakage preventing member include a transparent electrode material, and a connection is provided to cause a voltage difference between the common electrode and the first light leakage preventing member, and the common electrode and the second light leakage preventing member, to be "0".

16. The liquid crystal display of claim 15, wherein the common electrode is electrically connected to the first light leakage preventing member, and the common electrode is electrically connected to the second light leakage preventing member.

17. The liquid crystal display of claim 16, wherein the lower panel includes:

a substrate;

a partition disposed on the substrate and corresponding to the outer part of the pixel areas;

a color filter disposed inside the partition; and an insulating layer disposed on the partition and the color filter, wherein the first light leakage preventing member and the second light leakage preventing member are disposed on the insulating layer.

18. The liquid crystal display of claim 1, wherein, in addition to a first column of pixel areas formed by said succession of the pixel areas extending longitudinally from the first to the second of the opposed edges, the display area is populated by alike and side by side further successions of pixel areas such that said arrangement of the first pixel area, the middle pixel areas, and the final pixel area is provided in all display area columns.

19. The liquid crystal display of claim 18, wherein at least two first light leakage preventing members of adjacent columns are connected to each other, and at least two second light leakage preventing members of adjacent columns are connected to each other.

20. The liquid crystal display of claim 19, wherein the first light leakage preventing members are integrally formed, and the second light leakage preventing members are integrally formed.

\* \* \* \* \*